(12) United States Patent
Shen et al.

(10) Patent No.: US 8,842,390 B2
(45) Date of Patent: Sep. 23, 2014

(54) WRITE POLE BOX SHIELD

(71) Applicant: Seagate Technology LLC, Cupertino, CA (US)

(72) Inventors: Zhe Shen, Lakeville, MN (US); Luo Yong, Plymouth, MN (US); Wei Tan, Eden Prairie, MN (US); Dong Lin, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/745,031

(22) Filed: Jan. 18, 2013

(65) Prior Publication Data

US 2014/0204485 A1 Jul. 24, 2014

(51) Int. Cl.
*G11B 5/127* (2006.01)
*G11B 5/115* (2006.01)

(52) U.S. Cl.
CPC ..................................... *G11B 5/115* (2013.01)
USPC ...................................................... 360/125.3

(58) Field of Classification Search
USPC ............... 360/119.03, 119.02, 119.04, 125.3, 360/125.13, 125.15
See application file for complete search history.

(56) References Cited

U.S. PATENT DOCUMENTS

| | | | |
|---|---|---|---|
| 5,568,335 A | 10/1996 | Fontana et al. | |
| 7,233,457 B2 * | 6/2007 | Johnston et al. | 360/125.04 |
| 7,414,816 B2 * | 8/2008 | Fontana et al. | 360/318.1 |
| 8,094,399 B2 * | 1/2012 | Roppongi et al. | 360/55 |
| 8,358,486 B2 * | 1/2013 | Biskeborn et al. | 360/121 |
| 8,611,046 B2 * | 12/2013 | Wu et al. | 360/125.3 |
| 2005/0128637 A1 * | 6/2005 | Johnston et al. | 360/125 |
| 2005/0264944 A1 * | 12/2005 | Fontana et al. | 360/313 |
| 2010/0214692 A1 | 8/2010 | Kief et al. | |
| 2010/0301007 A1 * | 12/2010 | Ishizaki et al. | 216/22 |
| 2011/0085265 A1 * | 4/2011 | Biskeborn et al. | 360/123.12 |
| 2011/0255196 A1 * | 10/2011 | Wu et al. | 360/244.2 |
| 2012/0012555 A1 * | 1/2012 | Yan et al. | 216/22 |
| 2013/0086799 A1 * | 4/2013 | Biskeborn et al. | 29/603.01 |

* cited by examiner

*Primary Examiner* — Allen T Cao

(74) *Attorney, Agent, or Firm* — Hall Estill Attorneys at Law

(57) ABSTRACT

A magnetic element may be generally configured as a data writer constructed at least with a write pole within a box shield that consists of first and second side shields and first and second vertical shields. The write pole may be separated from the box shield by a multi-layer gap structure that consists of at least two gap layers of dissimilar materials.

20 Claims, 4 Drawing Sheets

US 8,842,390 B2

WRITE POLE BOX SHIELD

SUMMARY

Various embodiments are generally directed to a magnetic element capable of being used in high data bit density data storage environments.

In accordance with various embodiments, a write pole may be constructed within a box shield that consists of first and second side shields and first and second vertical shields. The write pole can be separated from the box shield by a multi-layer gap structure that consists of at least two gap layers of dissimilar materials.

DETAILED DESCRIPTION

The proliferation of data usage has emphasized the form factor and data capacity of data storage devices, especially devices with faster data access times and increased data access reliability. Increasing data storage capacity in combination with fast data access times may correspond with smaller data access components, such as data reader laminations and data write poles, and increasingly robust magnetic shielding. However, shielding of plated components can impose process and design complexity that may detrimentally affect magnetic performance, such as magnetic field gradient, magnetic moment, and magnetic properties flexibility. Conversely, the use of a milled data access component can maintain magnetic performance, but pose difficult construction with shaped components, like trapezoidal shaped write poles. Thusly, there is a continued industry demand for magnetic shield configurations capable of being implemented with milled in reduced form factor data storage devices without decreasing magnetic field and gradient.

Accordingly, a magnetic element can be configured in accordance with various embodiments to have at least a write pole within a box shield that consists of first and second side shields and first and second vertical shields, where the write pole may be separated from the box shield by a multi-layer gap structure that consists of at least two gap layers of dissimilar materials. The use of dissimilar gap layers allows for the magnetic and physical isolation of the write pole from the shields while providing a mill stop layer that aids in shaping the write pole without plating processes. Such a shaped and milled write pole can provide high write field gradient and reduced adjacent track interference that has robust magnetic shielding.

Figure 1:
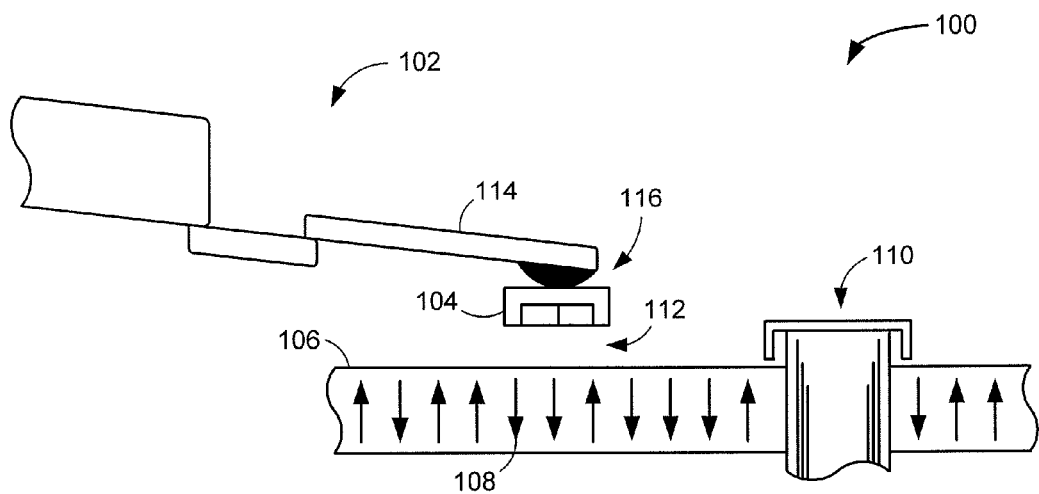
FIG. 1 is a block representation of an example data storage device constructed and operated in accordance with various embodiments.

The use of a multi-layer box shield about a write pole is not limited to a particular environment, but FIG. 1 generally illustrates a block representation of an example data storage device 100 that can utilize a tuned magnetic element in accordance with various embodiments. The data storage device 100 is shown in a non-limiting configuration where an actuating assembly 102 is capable of positioning a transducing head 104 over a variety of locations on a magnetic storage media 106 where stored data bits 108 are located on predetermined data tracks. The storage media 106 can be attached to one or more spindle motors 110 that rotate during use to produce an air bearing surface (ABS) 112 on which a slider portion 114 of the actuating assembly 102 flies to position a head gimbal assembly (HGA) 116, which includes the transducing head 104, over a predetermined portion of the media 106.

The transducing head 104 can be configured with one or more transducing elements, such as a magnetic writer, magnetically responsive reader, and magnetic shields, which operate to program and read data from the selected data tracks of the storage media 106, respectively. In this way, controlled motion of the actuating assembly 102 correspond with alignment of the transducers with the data tracks defined on the storage media surfaces to write, read, and rewrite data. As data bits 108 become more densely positioned in data tracks with smaller radial widths, the head 104 may inadvertently receive magnetic flux from data bits on adjacent data tracks, which can induce magnetic noise and interference that degrades performance of the data storage device 100.

Figure 2:
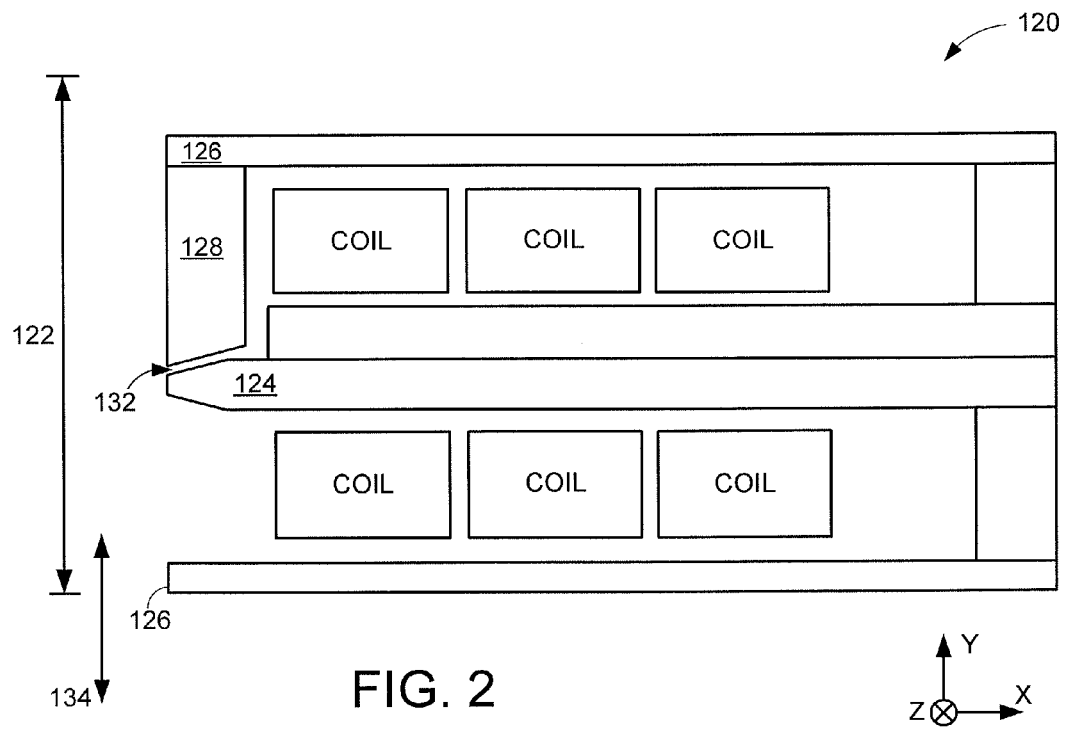
FIG. 2 illustrates a cross-sectional block representation of an example magnetic element capable of being used in the data storage device of FIG. 1.

FIG. 2 displays a cross-sectional block representation of an example magnetic element 120 constructed with magnetic shielding to mitigate the effects of reduced form factor data tracks and more densely packed data bits. While the magnetic element 120 can have one or more data access elements, a magnetic data writer 122 portion of the magnetic element 120 is shown, which can operate to write data to from an adjacent storage media, such as media 106 of FIG. 1. The magnetic data writer 122 has a main write pole 124 and at least one return pole 126 that creates a writing circuit to impart a predetermined magnetic orientation to the adjacent storage media. In the non-limiting configuration of the data writer 124 shown in FIG. 2, two return poles 126 are each contactingly adjacent a trailing shield 128 that prevents flux in the poles 124 and 126 from extending beyond the bounds of the writing element 124. Each return pole 126 further contacts insulating material 132 that maintains magnetic separation of the writing poles 124 and 126.

The various shields of the magnetic element 120 can be characterized by their position with respect to the timing of encountering external bits, such as bits 108 of FIG. 1. In other words, the shields that encounter the external bits before the data writer 122 may be characterized as "leading" shields while shields that see the bits after the data writer 122 can be characterized as "trailing" shields. Such characterization extends to the difference between "uptrack" or "downtrack" of the transducing elements in that, depending on the direction of travel for the magnetic element 120 with respect to a data track 134 and external bits, the shields can be either leading or trailing and either uptrack or downtrack.

Figure 3:
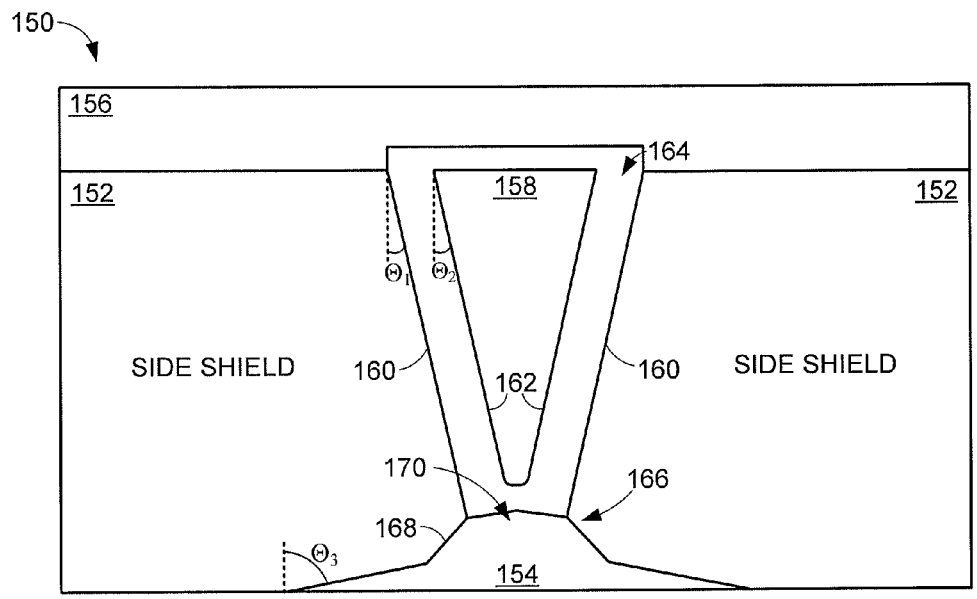
FIG. 3 shows an ABS view block representation of a portion of an example magnetic element constructed in accordance with some embodiments.

While the magnetic element 120 has a plurality of magnetic shields configured to focus magnetic flux from the write pole 124 to a predetermined data bit along a data track, increased data bit densities have led to the tighter data tracks that can impose magnetic flux on data bits along the Z axis. The addition of side shields in the Z axis with respect to the write pole 124 can tune the magnetic extent of the write pole 124 to conform to a reduced data track width. FIG. 3 displays an ABS view block representation of a portion of an example data writer 150 constructed in accordance with various embodiments to have side 152, leading 154, and trailing 156 shields about a write pole 158.

As shown, each side shield 152 is configured with tuned shield sidewalls 160 that are angled at a first predetermined orientation $\square_1$ with respect to the Y axis and face a corresponding pole sidewall 162 tuned to a second predetermined angular orientation $\square_2$ in relation to the Y axis. Various embodiments tune the shield 160 and pole 162 sidewalls to have matching or dissimilar angular orientations, which can provide a predetermined write gap 164 that can be uniform or varying distances from the write pole 158 to the respective side shields 152 to control magnetic performance of the write pole 158, such as the magnetic saturation of the side shields.

Figure 4:
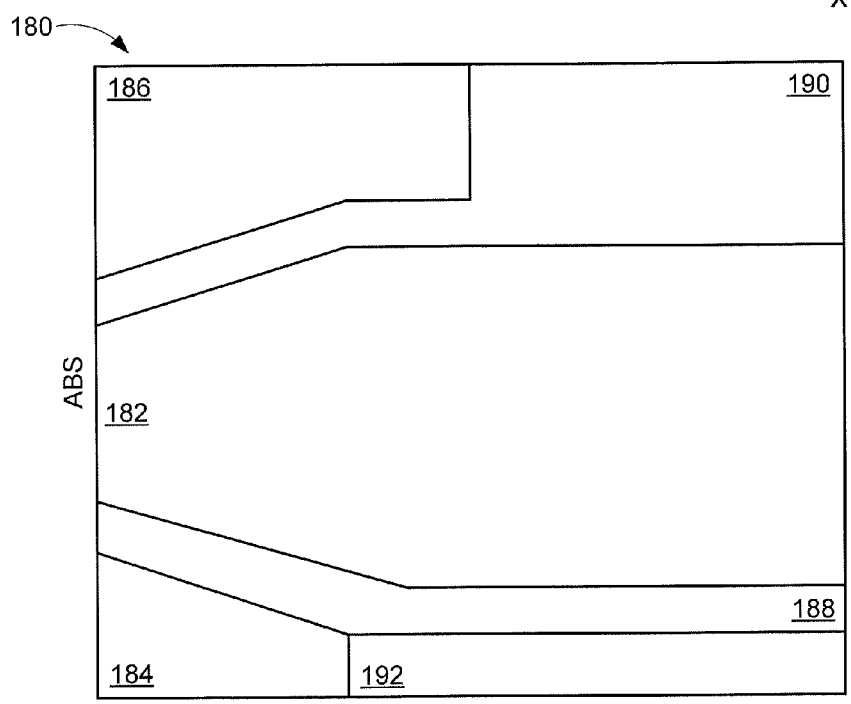
FIG. 4 displays a cross-sectional block representation of an example magnetic element constructed in accordance with various embodiments.

One, or both, side shields 152 can be further configured with a tapered feature 166 that provides at least one taper sidewall 168 that increases the distance between the side shields 152 downtrack from the write pole 158, which may be occupied partially or wholly by a tip 170 of the leading shield 154. FIG. 4 generally illustrates a cross-sectional block representation of a portion of a data writer 180 formed in accordance to some embodiments to have a write pole 182 disposed between leading 184 and trailing 186 shields on the ABS. The insertion of non-magnetic spacer 188 and gap 190 layers between the write pole 182 and the respective leading 184 and trailing 186 shields act in concert with the non-magnetic material filling the write gap 164 of FIG. 3 to provide a "box shield" where the write pole is surrounded by non-magnetic material and magnetic shields each tuned to provide a predetermined magnetic performance.

Through the tuned configuration of the various shields with respect to the write pole 158, the magnetic extent of the data writer 150 can be reduced to reliably program only predetermined data bits at the exclusion of data bits on adjacent data tracks. However, the addition of side shields can complicate write pole manufacturing and operation as intricate shapes and dimensions can be difficult to construct. More specifically, side shields and reduced data writer dimensions can make milling a write pole difficult compared to plating operations, which may result in degraded magnetic moment and magnetic flexibility.

Figure 5:
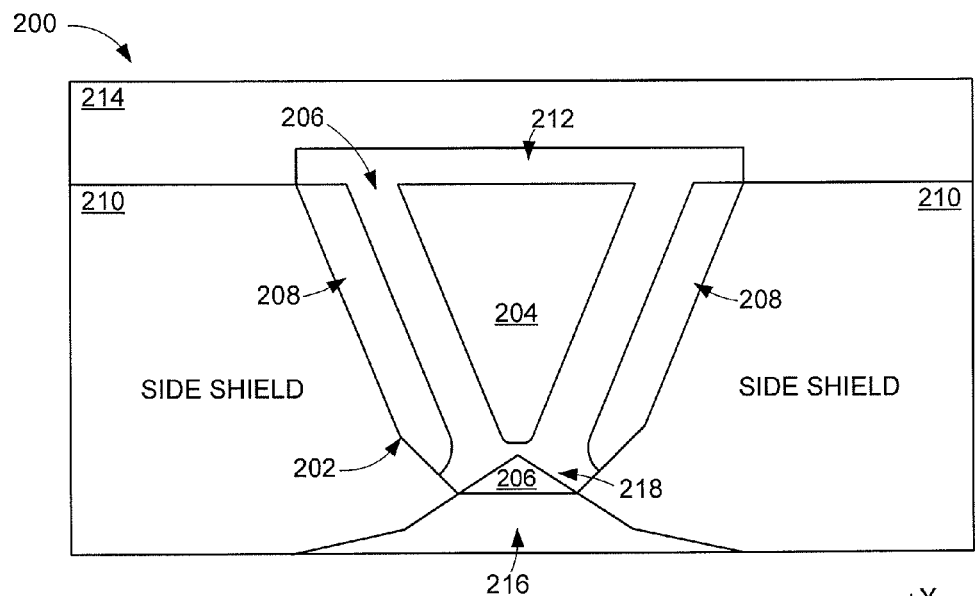
FIG. 5 illustrates an ABS view block representation of a portion of an example magnetic element constructed in accordance with various embodiments.

With such manufacturing issues in mind, FIG. 5 shows an ABS view block representation of a portion of an example data writer 190 having a box shield separated from the write pole 204 by a multi-layer gap structure 202 to be efficiently milled instead of plated. The multi-layer gap structure 202 is not limited to particular materials, number of layers, and orientation with respect to the write pole 204, but can consist of a non-magnetic gap layer 206, such as alumina, and a mill stop layer 208, such as a transition metal material like Ruthenium, as shown. The combination of a non-magnetic gap layer 206 and mill stop layer 208 between the write pole 204 and the respective side shields 210 can provide more robust magnetic isolation than a single layer of material, which can correspond to increased magnetic performance as reduced size write gap are employed, and allow for the write pole 204 to be manufactured via milling instead of plating as the mill stop layer 208 dictates where milling operations terminate.

In the past, milling of such a precise shape and dimensions would be time consuming and complex undertaking due at least in part to the intricate sidewall angles of the write pole and side shields, as illustrated in FIG. 3. The daunting and unpractical milling of the write pole 204 leads to a plating construction where a groove with a predetermined shape is filled. However, the lower magnetic moment and reduced magnetic flexibility corresponding to plated write poles can pose operational limitations as magnetic components become more condensed in reduced form factor data storage devices. Thus, the inclusion of at least one mill stop layer 208 in the multi-layer structure 202 can minimize manufacturing complexity and allow for the milled construction of the write pole 204.

While the orientation and material of the various multi-layer structure 202 layers is not limited to the configuration shown in FIG. 5, the complete surrounding of the write pole 204 with the non-magnetic material, such as Aluminum Oxide, of the non-magnetic gap layer 206, including the gap 212 between the trailing shield 214 and write pole 204, allows the magnetic side 210, leading 216, and trailing 214 shields to act as a unified box shield as the non-magnetic gap layer 206 and non-magnetic leading tip 218 of the magnetic leading shield 216 provides increased magnetic isolation of the write pole 204. Such surrounding of the write pole 204 can be tuned in a variety of different manners, such as making the gap layer 206 and mill stop layer 208 different thickness overall or in selected portions of the write pole 204, to provide a predetermined amount of magnetic isolation of the write pole 204 in balance with reduced dimensions conducive to small form factor, high data bit density data storage devices.

Figure 6:
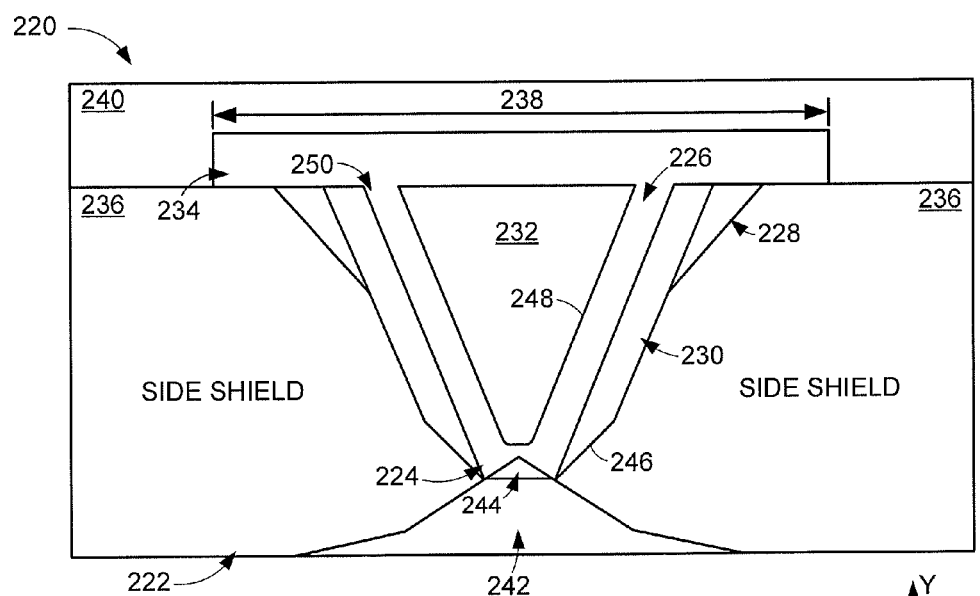
FIG. 6 is an ABS view block representation of a portion of an example magnetic element constructed in accordance with some embodiments.

FIG. 6 provides an ABS view block representation of a portion of an example data writer 220 constructed with a box shield 222 and multi-layer structure 224 tuned differently than the multi-layer structure 202 of FIG. 5, which generally illustrates the diversity of the multi-layer structure 222 when tuned in accordance with various embodiments. The multi-layer structure 224 has first 226 and second 228 non-magnetic gap layers separated by a mill stop layer 230. As shown, the second non-magnetic gap layer 228 is positioned proximal a trailing edge of the write pole 232 and contacting adjacent a letterbox 234 extension of the first non-magnetic gap layer 226.

The size, material, and position of the second non-magnetic gap layer 228 can be tuned in a variety of ways, such as the displayed extension from the letterbox 234 to a point intermediate of the leading and trailing edges of the write pole, to provide predetermined operational characteristics like reduced magnetic saturation of the side shields 236. Such tuning can, in some embodiments, position multiple separated second non-magnetic gap layer 228 portions between the mill stop layer 230 and the side shields 236 to provide additional magnetic isolation of the write pole 232 in certain regions of the box shield 222.

The operational characteristics of the data writer 220 may be further tuned by setting the width 238 of the letterbox 234, as measured along the Z axis, to a predetermined length. For example, the width 238 can be greater than the distance between the second non-magnetic gap layers 228, but less than the overall width of the trailing shield 240. The multi-layer structure 224 can additionally allow for tuning of the interface between the leading edge of the write pole 232 and the leading shield 242 with a non-magnetic leading tip 244, which may include the angular configuration of a leading sidewall 246 of the side shields 236 to be different than the pole sidewall 248 of the write pole 232. That is, the leading sidewall 246 and leading shield 242 can be tuned with non-magnetic material 244 and angled orientations to provide a predetermined amount of magnetic isolation for the leading edge of the write pole 232 that may differ from the amount of magnetic isolation for the trailing edge.

The use of multiple non-magnetic gap layers can provide the ability to tune the magnetic isolation of the write pole 232 through material selection. As a non-limiting example, alumina may be used for the first gap layer 226 while $SiO_2$ is used for the second gap layer 228 to provide a varying magnetic gradient within the write gap 250. Through these diverse multi-layer structure 224 tuning options, the data writer 220 can be catered to a variety of data environments by adjusting the magnetic isolation for portions of the write pole 232 to allow more, or less, isolation conducive to fast data accesses to densely packed data bits.

Figure 7A:
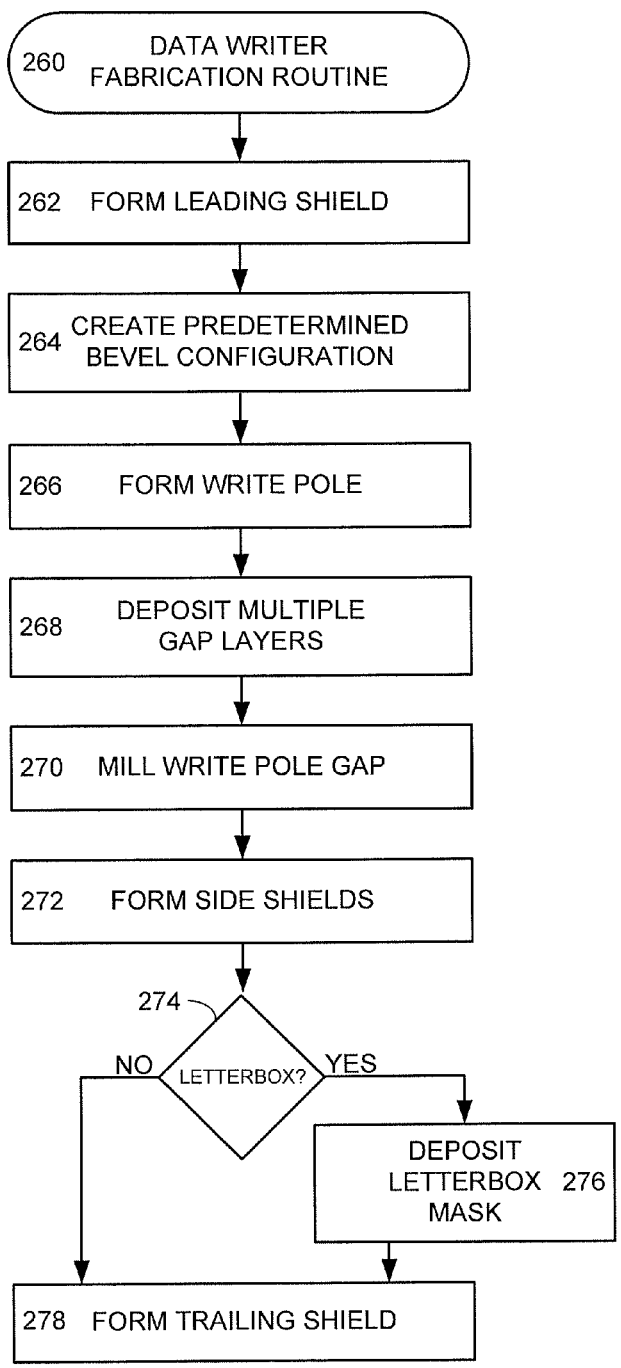
FIGS. 7A and 7B provide a flowchart and associated illustrations for an example data writer fabrication routine in accordance with various embodiments.
Figure 7B:
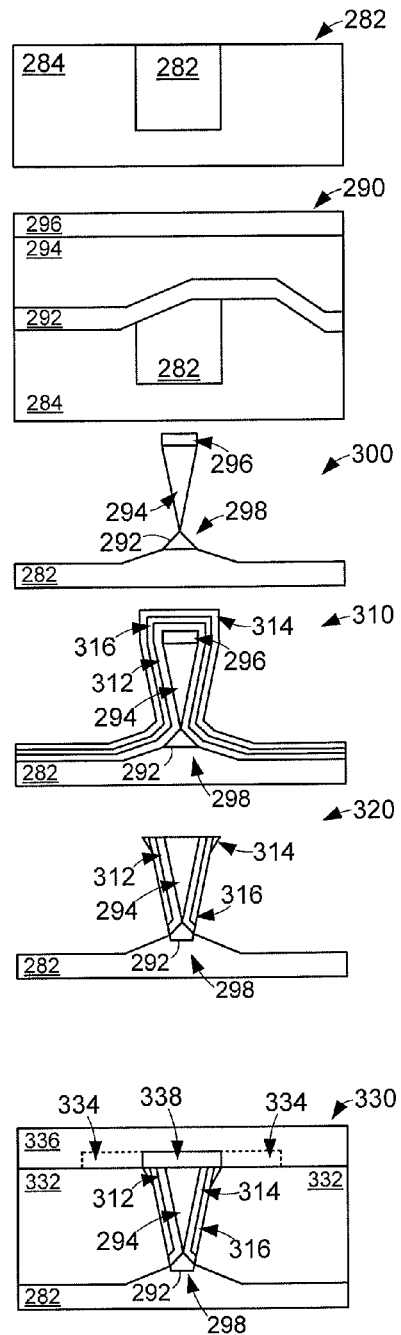

With the variety of non-limiting multi-layer structure configurations possible to optimize write pole performance, the construction of a magnetic element can undergo a series of general and specific decisions to tune the magnetic operation. FIGS. 7A and 7B provides an example data writer fabrication routine 260 conducted in accordance with various embodiments to tune the magnetic isolation of a write pole through the construction of a multi-layer structure. The routine 260 initially forms a leading shield in step 262, which is illustrated by element 280 with leading shield material 282 formed in a recess of a substrate 284.

Steps 264 and 266 subsequently create a predetermined bevel configuration and form a write pole. Element 290 corresponds to steps 264 and 266 by having a beveled section and a write pole lamination that includes a non-magnetic spacer layer 292, a write pole material 294, and a write pole hard mask 296. Step 266 may further entail etching and milling of the write pole to provide a predetermined leading shield and write pole configuration such as the non-magnetic leading shield tip 298 shown by element 300. Next, step 268 deposits the multi-layer gap structure with predetermined number of layers, materials, sizes, and positions. Element 310 displays a dual non-magnetic gap layer 312 and 314 separated by a mill stop layer 316 that each continuously extend to surround the write pole 294.

With the multi-layer gap structure deposited, step 270 proceeds to mill through some portions of the outside non-magnetic gap layer to the mill stop layer. The milling of step 270 can further include the planarization of the multi-layer gap structure and write pole hard mask from the trailing portion of the write pole, as shown in element 320. Conclusion of the milling operation can advance routine 260 to step 272 and element 330 where side shields 332 are formed on opposite sides of the write pole in contacting abutment with the multi-layer gap structure.

Formation of the side shields brings routine 260 to decision 274 where the inclusion of a letterbox 334 is evaluated. If a letterbox 334 is chosen in decision 274, step 276 deposits a letterbox mask shaped with a predetermined width to form the letterbox 334 after the trialing shield 336 is formed in step 278. A decision not to include a letterbox 334 can proceed to step 278 where a non-magnetic insert 338 is deposited atop the write pole to complete the multi-layer gap structure and magnetically isolate the write pole from the trailing shield 336.

Through the various steps and decisions of routine 260, a data writer can be constructed with tuned magnetic isolation of a write pole with a multi-layer gap structure. It should be noted, however, that the various steps and decisions of routine 260 shown in FIGS. 7A and 7B are not required or limited as the various decisions and steps can be omitted, changed, and added. As an example, an additional decision can be evaluated to determine how many layers are to be included in the multi-layer gap structure.

With the tuned configuration of the multi-layer gap structure, magnetic performance of the write pole can be catered to provide heighted magnetic isolation in certain portions, like the trailing edge of the write pole, and reduced magnetic isolation in other portions, like the leading edge of the write pole. Such tuned multi-layer gap structure can further allow the use of milling operations to construct the write pole, which provides more robust magnetic performance versus a plated write pole. The ability to form a milled write pole with predetermined magnetic isolation in reduced form factor environments allows the data writer to be implemented in modern high data bit density, reduced form factor data storage devices.

In addition, while the embodiments have been directed to magnetic programming, it will be appreciated that the claimed invention can readily be utilized in any number of other applications, including data storage device applications. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A magnetic element apparatus comprising a write pole within a box shield comprising first and second side shields and first and second vertical shields, the write pole separated from the box shield by a multi-layer gap structure comprising at least two gap layers of dissimilar materials.

2. The apparatus of claim 1, wherein the multi-layer gap structure physically connects each shield with the write pole.

3. The apparatus of claim 1, wherein the gap layers comprise a mill stop layer and a non-magnetic layer.

4. The apparatus of claim 3, wherein the mill stop layer comprises Ruthenium.

5. The apparatus of claim 3, wherein the non-magnetic layer is alumina.

6. The apparatus of claim 1, wherein the multi-layer gap structure continuously surrounds the write pole.

7. The apparatus of claim 1, wherein less than all the gap layers surround the write pole.

8. The apparatus of claim 1, wherein the multi-layer gap structure is positioned on an air bearing surface (ABS).

9. The apparatus of claim 1, wherein the gap layers each have a gap sidewall angularly oriented to match a pole sidewall.

10. The apparatus of claim 1, wherein the gap layers each have unique thicknesses.

11. A magnetic element comprising a write pole within a box shield comprising first and second side shields and first and second vertical shields, the write pole separated from the box shield by a multi-layer gap structure comprising first and second non-magnetic gap layers separated by a mill stop layer, at least two of the non-magnetic gap and mill stop layers formed of dissimilar materials.

12. The magnetic element of claim 11, wherein the second non-magnetic gap layer is positioned proximal a trailing edge of the write pole and configured to extend to a point intermediate the trailing edge and a leading edge of the write pole.

13. The magnetic element of claim 11, wherein the second non-magnetic gap layer has a first gap sidewall that has a different angular orientation than a second gap sidewall of the first non-magnetic gap layer.

14. The magnetic element of claim 11, wherein the mill stop layer contacts only the side shields.

15. The magnetic element of claim 11, wherein the first non-magnetic gap layer continuously extends to surround the write pole.

16. The magnetic element of claim 11, wherein the first non-magnetic gap layer extends beyond a write gap region into a letterbox region between the trailing and side shields.

17. The magnetic element of claim 11, wherein first and second non-magnetic gap layers are dissimilar materials.

18. A data writer comprising a write pole within a box shield comprising first and second side shields and first and second vertical shields, the write pole separated from the box shield by a multi-layer gap structure comprising at least two gap layers of dissimilar materials, at least one first gap layer of the multi-layer gap structure extending to a letterbox region between the side and trialing shields.

19. The data writer of claim 18, wherein the letterbox has a predetermined width greater than a gap width between the side shields.

20. The data writer of claim 18, wherein the letterbox is formed with the union of at least one side shield and a trailing shield.

* * * * *